US012057587B2

(12) United States Patent
Lee et al.

(10) Patent No.: US 12,057,587 B2
(45) Date of Patent: Aug. 6, 2024

(54) METHOD FOR PRODUCING CARRIER FOR ELECTRODE CATALYST, PRECURSOR OF CARRIER FOR ELECTRODE CATALYST, AND CARRIER FOR ELECTRODE CATALYST, COMPRISING SAME

(71) Applicant: LG CHEM, LTD., Seoul (KR)

(72) Inventors: Wonkyun Lee, Daejeon (KR); Sang Hoon Kim, Daejeon (KR); Gyo Hyun Hwang, Daejeon (KR); Jun Yeon Cho, Daejeon (KR); Kwanghyun Kim, Daejeon (KR); Ran Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 18/309,085

(22) Filed: Apr. 28, 2023

(65) Prior Publication Data

US 2023/0290962 A1  Sep. 14, 2023

Related U.S. Application Data

(62) Division of application No. 16/620,813, filed as application No. PCT/KR2018/010402 on Sep. 6, 2018, now Pat. No. 11,699,795.

(30) Foreign Application Priority Data

Sep. 20, 2017  (KR) .................. 10-2017-0121250

(51) Int. Cl.
*H01M 4/88* (2006.01)
*H01M 4/90* (2006.01)
(Continued)

(52) U.S. Cl.
CPC ....... *H01M 4/8803* (2013.01); *H01M 4/9083* (2013.01); *H01M 4/926* (2013.01); *H01M 8/1004* (2013.01); *H01M 2004/8684* (2013.01)

(58) Field of Classification Search
CPC ............. H01M 4/8825; H01M 4/8828; H01M 4/8842; H01M 4/8803; H01M 4/8807;
(Continued)

(56) References Cited

U.S. PATENT DOCUMENTS

2008/0233466 A1   9/2008  Yuasa et al.
2010/0048380 A1*  2/2010  Calabrese Barton ... H01M 4/96
                                                          502/174
(Continued)

FOREIGN PATENT DOCUMENTS

CN      1588680 A     3/2005
EP    2 431 093 A2    3/2012
(Continued)

OTHER PUBLICATIONS

International Search Report issued in PCT/KR2018/010402 (PCT/ISA/210), dated Mar. 12, 2019.

*Primary Examiner* — Raymond Alejandro
(74) *Attorney, Agent, or Firm* — Birch, Stewart, Kolasch & Birch, LLP

(57) ABSTRACT

A method for preparing a support for an electrode catalyst including forming first and second polymer layers having charges different from each other on a surface of a carbon support and carbonizing the result, wherein the polymers included in the first and the second polymer layers are an aromatic compound including a heteroatom, and the first or the second polymer includes a pyridine group.

5 Claims, 5 Drawing Sheets

(51) Int. Cl.
*H01M 4/92* (2006.01)
*H01M 8/1004* (2016.01)
*H01M 4/86* (2006.01)

(58) Field of Classification Search
CPC .... H01M 4/881; H01M 4/9083; H01M 4/926; H01M 8/1004; H01M 2004/8684
See application file for complete search history.

(56) References Cited

U.S. PATENT DOCUMENTS

| | | |
|---|---|---|
| 2013/0288155 A1 | 10/2013 | Kim et al. |
| 2015/0017566 A1* | 1/2015 | Watanabe ........... H01M 4/8668 |
| | | 429/480 |
| 2015/0295250 A1* | 10/2015 | Nagami ................ H01M 4/92 |
| | | 502/185 |
| 2018/0375108 A1 | 12/2018 | Cho et al. |

FOREIGN PATENT DOCUMENTS

| | | |
|---|---|---|
| JP | 2006-75709 A | 3/2006 |
| JP | 2009-277360 A | 11/2009 |
| JP | 2010-221126 A | 10/2010 |
| JP | 2012-181961 A | 9/2012 |
| JP | 2015-59058 A | 3/2015 |
| KR | 10-2005-0098818 A | 10/2005 |
| KR | 10-2010-0122654 A | 11/2010 |
| KR | 10-2013-0122507 A | 11/2013 |
| KR | 10-2014-0060302 A | 5/2014 |
| KR | 10-2017-0092125 A | 8/2017 |
| WO | WO 2006/083029 A1 | 8/2006 |
| WO | WO 2012/074160 A1 | 6/2012 |
| WO | WO 2013/021145 A1 | 2/2013 |

* cited by examiner

[FIG. 1]
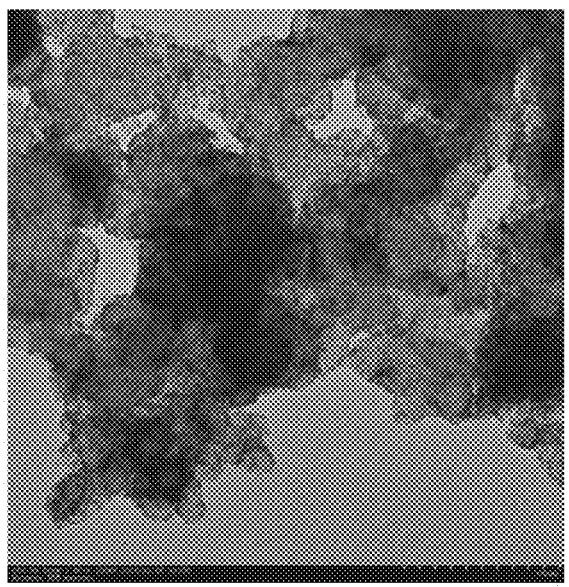
[FIG. 2]
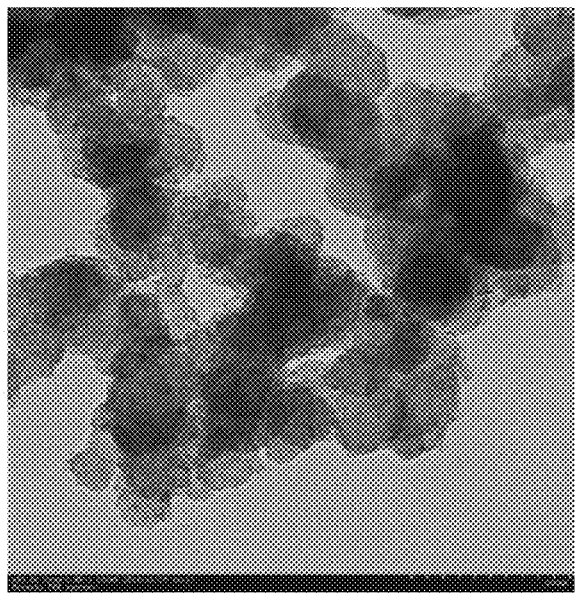

[FIG. 3]
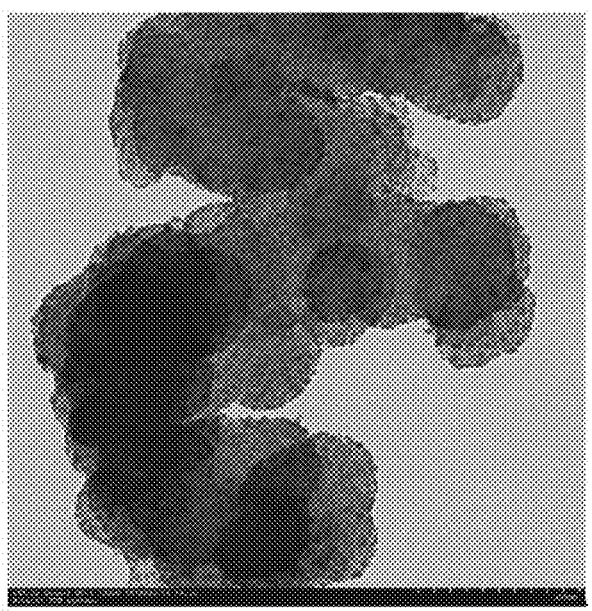

[FIG. 4]
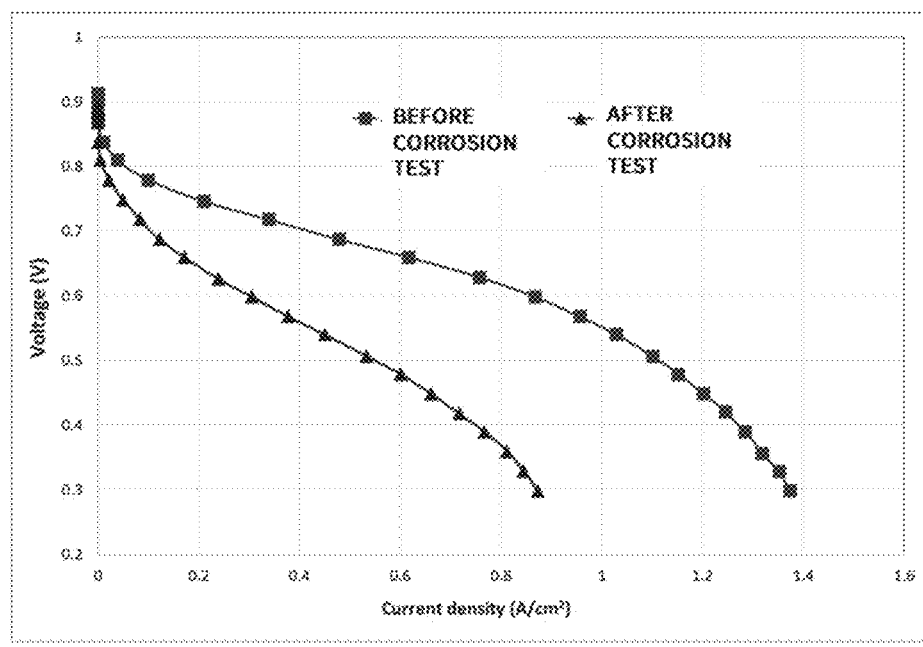
[FIG. 5]
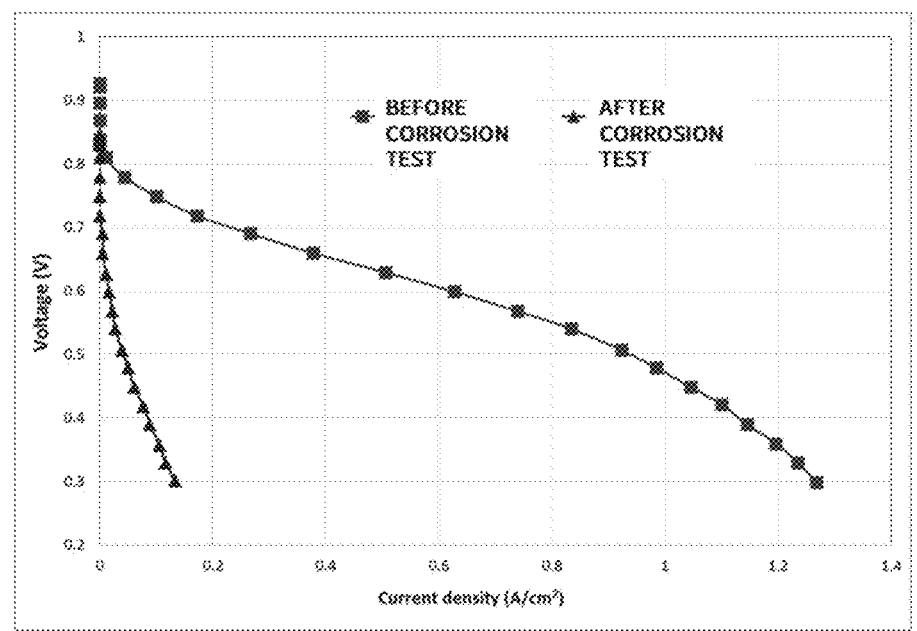

[FIG. 6]
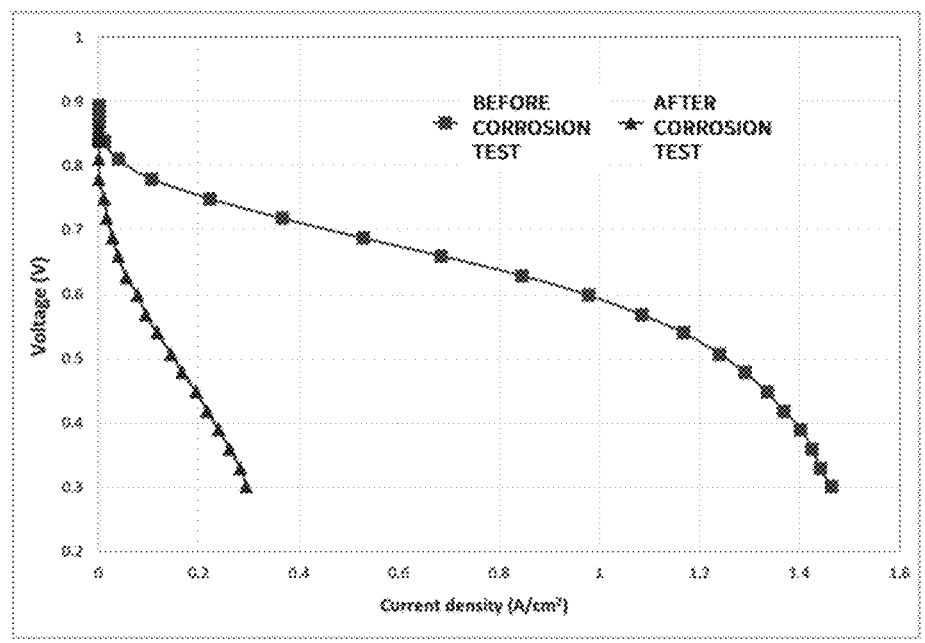

[FIG. 7]
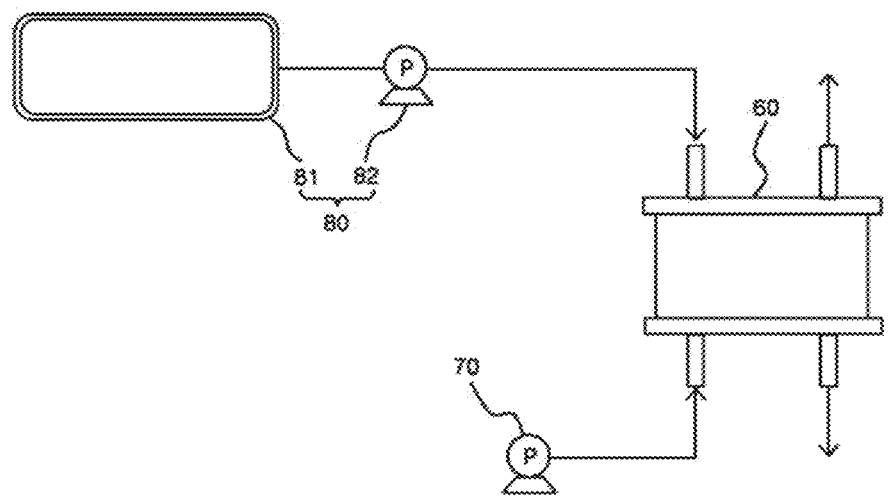
CONVENTIONAL ART

METHOD FOR PRODUCING CARRIER FOR ELECTRODE CATALYST, PRECURSOR OF CARRIER FOR ELECTRODE CATALYST, AND CARRIER FOR ELECTRODE CATALYST, COMPRISING SAME

CROSS-REFERENCE TO RELATED APPLICATIONS

This application is a Divisional of U.S. application Ser. No. 16/620,813, filed on Dec. 9, 2019, which was filed as PCT International Application No. PCT/KR2018/010402 on Sep. 6, 2018, which claims the benefit under 35 U.S.C. § 119 (a) to Patent Application No. 10-2017-0121250, filed with the Korean Intellectual Property Office on Sep. 20, 2017, the entire contents of which are incorporated herein by reference.

The present disclosure relates to a method for preparing a support for an electrode catalyst, a precursor of a support for an electrode catalyst, and a support for an electrode catalyst including the same.

BACKGROUND ART

A fuel cell is, as a clean energy source capable of replacing fossil energy, a power generating system converting chemical energy of hydrogen and oxygen included in hydrocarbon-based materials such as methanol, ethanol and natural gas directly to electric energy by an electrochemical reaction.

Typical examples of a fuel cell may include a polymer electrolyte membrane fuel cell (PEMFC) or a direct methanol fuel cell (DMFC) using methanol as a fuel, and the like, and what influences performance in the PEMFC or the DMFC is a membrane-electrode assembly (MEA).

The MEA is formed with a solid polymer electrolyte membrane including a hydrogen ion conducting polymer and two electrodes separated thereby, and these two electrodes are referred to as an anode (called "oxidation electrode" or "fuel electrode") a cathode (called "reduction electrode" or "air electrode").

The anode and the cathode include an electrode catalyst for activating a reaction, and the electrode catalyst is generally used while supporting a metal catalyst on a carbon support, and therefore, a corrosion problem of the carbon support is an important challenge to resolve.

DISCLOSURE

Technical Problem

The present disclosure is directed to providing a method for preparing a support for an electrode catalyst, a precursor of a support for an electrode catalyst, and a support for an electrode catalyst including the same.

Technical Solution

One embodiment of the present specification provides a method for preparing a support for an electrode catalyst including preparing a carbon support; forming a first polymer layer including a first polymer having a charge on a surface of the carbon support; forming a second polymer layer including a second polymer having a charge opposite to the first polymer on the first polymer layer; and carbonizing the first polymer layer and the second polymer layer, wherein the first polymer and the second polymer are an aromatic compound including a heteroatom, and the first polymer or the second polymer includes a pyridine group.

Another embodiment of the present specification provides a precursor of a support for an electrode catalyst including a carbon support; a first polymer layer formed on the carbon support and including a first polymer having a charge; and a second polymer layer formed on the first polymer layer and including a second polymer having a charge opposite to the first polymer, wherein the first polymer and the second polymer are an aromatic compound including a heteroatom, and the first polymer or the second polymer includes a pyridine group.

Another embodiment of the present specification provides a support for an electrode catalyst including a carbide of the precursor of a support for an electrode catalyst.

Another embodiment of the present specification provides an electrode catalyst having metal nanoparticles supported on the support for an electrode catalyst.

Another embodiment of the present specification provides a membrane-electrode assembly including an electrode catalyst layer including the electrode catalyst, and an electrolyte membrane.

Another embodiment of the present specification provides a fuel cell including the membrane-electrode assembly.

Advantageous Effects

A method for preparing a support for an electrode catalyst of the present disclosure has an advantage of strengthening durability while maintaining properties of the support material to the maximum.

DESCRIPTION OF DRAWINGS

FIG. 1 shows a transmission electron microscope (hereinafter, TEM) image of an electrode catalyst prepared using a support of Example.

FIG. 2 shows a TEM image of an electrode catalyst prepared using a support of Comparative Example 1.

FIG. 3 shows a TEM image of an electrode catalyst prepared using a support of Comparative Example 2.

FIG. 4 shows results of a carbon corrosion evaluation on an electrode catalyst prepared using a support of Example.

FIG. 5 shows results of a carbon corrosion evaluation on an electrode catalyst prepared using a support of Comparative Example 1.

FIG. 6 shows results of a carbon corrosion evaluation on an electrode catalyst prepared using a support of Comparative Example 2.

FIG. 7 schematically illustrates a fuel cell used in the art.

REFERENCE NUMERAL

60: Stack
70: Oxidizer Supply Unit
80: Fuel Supply Unit
81: Fuel Tank
82: Pump

MODE FOR DISCLOSURE

In the present specification, a description of a certain part "including" certain constituents means capable of further including other constituents, and does not exclude other constituents unless particularly stated on the contrary.

In the present specification, a description of a certain member being placed "on" another member includes not only a case of the one member adjoining the another member but a case of still another member being present between the two members.

Hereinafter, preferred embodiments of the present disclosure will be described. However, embodiments of the present disclosure may be modified to various other forms and the scope of the present disclosure is not limited to the embodiments to describe below. In addition, embodiments of the present disclosure are provided in order to more fully describe the present disclosure to those having average knowledge in the art.

One embodiment of the present specification provides a method for preparing a support for an electrode catalyst including preparing a carbon support; forming a first polymer layer including a first polymer having a charge on a surface of the carbon support; forming a second polymer layer including a second polymer having a charge opposite to the first polymer on the first polymer layer; and carbonizing the first polymer layer and the second polymer layer, wherein the first polymer and the second polymer are an aromatic compound including a heteroatom, and the first polymer or the second polymer includes a pyridine group.

When replacing a material itself of a carbon support with carbon with high crystallinity as in the art, the specific surface area may decrease making high-dispersion and high-support catalyst preparation difficult.

Meanwhile, the preparation method according to the present disclosure uses a method of forming a crystalline carbon film on a surface of a support, and therefore, existing properties of the support may be maintained, and durability may be strengthened while accomplishing high-dispersion and high-support.

According to one embodiment of the present specification, the carbon support may be a carbon-based support, and as the carbon-based support, one or more types selected from the group consisting of carbon black, carbon nanotubes (CNT), graphite, graphene, activated carbon, mesoporous carbon, carbon fiber and carbon nanowires may be used.

According to one embodiment of the present specification, the forming of a first polymer layer is carried out by coating a solution including the first polymer and a solvent on a surface of the carbon support.

According to one embodiment of the present specification, the forming of a second polymer layer is carried out by coating a solution including the second polymer and a solvent on the first polymer layer.

The first polymer layer and the second polymer layer each include a polymer having charges different from each other, and therefore, a stable laminate may be formed by the action of interlayer electrostatic attraction.

In addition, carrying out lamination by coating each polymer layer having charges different from each other as above has an advantage in that aggregation due to attraction and formation of non-uniform layers caused therefrom may be prevented compared to when using a method of mixing these together and coating.

According to one embodiment of the present specification, the first polymer may be a cationic polymer, and the second polymer may be an anionic polymer.

In addition, according to one embodiment of the present specification, the first polymer may be an anionic polymer, and the second polymer may be a cationic polymer.

According to one embodiment of the present specification, the cationic polymer includes a pyridine group. Specifically, the cationic polymer may be one or more polymers selected from among poly(4-vinyl pyridine), poly(2-vinyl pyridine) and poly(2,5-pyridine), and may preferably be poly(4-vinyl pyridine).

When the cationic polymer includes a pyridine group, a defect free crystalline carbon film is formed after carbonization, and a nitrogen doping effect may be obtained.

According to one embodiment of the present specification, the anionic polymer may include a sulfonate group. Specifically, the anionic polymer may be polystyrene sulfonate.

According to one embodiment of the present specification, when the first polymer or the second polymer is a cationic polymer, the solvent may be one or more types selected from the group consisting of water; alcohols such as methanol, ethanol, propanol and isopropanol; and dimethylformamide, and may preferably be water.

According to one embodiment of the present specification, the solution including the cationic polymer and the solvent may further include at least one acid among hydrochloric acid, nitric acid and sulfuric acid, and may preferably include hydrochloric acid.

According to one embodiment of the present specification, when the first polymer or the second polymer is an anionic polymer, the solvent may be one or more types selected from the group consisting of water; alcohols such as methanol, ethanol, propanol and isopropanol; and dimethylformamide, and may preferably be water.

According to one embodiment of the present specification, the solution including the anionic polymer and the solvent may further include at least one acid among hydrochloric acid, nitric acid and sulfuric acid.

According to one embodiment of the present specification, when the solution including the first polymer and the solvent includes water as the solvent, the solution may further include potassium nitrate ($KNO_3$).

According to one embodiment of the present specification, the first polymer may be included in 0.05% by weight to 20% by weight based on the total weight of the solution including the first polymer and the solvent, and the solvent may be included in 80% by weight to 99.5% by weight based on the total weight of the solution including the first polymer and the solvent.

According to one embodiment of the present specification, the second polymer may be included in 0.05% by weight to 20% by weight based on the total weight of the solution including the second polymer and the solvent, and the solvent may be included in 80% by weight to 99.5% by weight based on the total weight of the solution including the second polymer and the solvent.

The polymer content being in the above-mentioned range has an advantage of forming a uniform coating layer since the support surface is readily coated.

According to one embodiment of the present specification, the first polymer and the second polymer may each have a weight average molecular weight of greater than or equal to 500 g/mol and less than or equal to 1,000,000 g/mol, and specifically greater than or equal to 1,000 g/mol and less than or equal to 100,000 g/mol.

The weight average molecular weights of the first polymer and the second polymer satisfying the above-mentioned range has an advantage in that coating is readily carried out, and residual polymers are readily washed after the coating.

According to one embodiment of the present specification, the carbonizing of the first polymer layer and the second polymer layer may be carried out for 30 minutes to 2 hours at a temperature of 800° C. to 2,000° C. under an inert gas atmosphere such as argon or nitrogen.

Through the carbonizing, the first polymer layer and the second polymer layer change into a form of one crystalline carbon film.

According to one embodiment of the present specification, the heteroatom may be N, O and/or S.

When consecutively laminating two polymers that have charges different from each other and are an aromatic compound including a heteroatom and then carbonizing the result, a defect free crystalline carbon film is formed. In other words, durability increases since water repellency increases by increasing crystallinity of the crystalline carbon film and corrosion caused by the resultant reaction of carbon and moisture is reduced. The fact that this may not be obtained when just one of the two polymers is not an aromatic compound including a heteroatom may be identified through comparing results of examples and comparative examples of the present specification to describe later.

One embodiment of the present specification provides a precursor of a support for an electrode catalyst including a carbon support; a first polymer layer formed on the carbon support and including a first polymer having a charge; and a second polymer layer formed on the first polymer layer and including a second polymer having a charge opposite to the first polymer, wherein the first polymer and the second polymer are an aromatic compound including a heteroatom, and the first polymer or the second polymer includes a pyridine group.

According to one embodiment of the present specification, the precursor of a support for an electrode catalyst may be a state before carbonizing the first polymer layer and the second polymer layer, that is, before changing into a crystalline layer, and the first polymer layer and the second polymer layer are attached to each other by electrostatic attraction in the precursor of a support for an electrode catalyst.

According to one embodiment of the present specification, the first polymer layer and the second polymer layer may each have a thickness of 0.1 nm to 5 nm.

When the first polymer layer and the second polymer layer have a thickness of 0.1 nm or greater, sufficient durability may each be obtained, and when the thickness is 5 nm or less, stable adhesion may be maintained by the attraction acting between the two polymer layers.

According to one embodiment of the present specification, each constitution of the precursor of a support for an electrode catalyst is the same as the descriptions provided above.

According to one embodiment of the present specification, the first polymer may be a cationic polymer, and the second polymer may be an anionic polymer.

In addition, according to one embodiment of the present specification, the first polymer may be an anionic polymer, and the second polymer may be a cationic polymer.

One embodiment of the present specification provides a support for an electrode catalyst including a carbide of the precursor of a support for an electrode catalyst.

According to one embodiment of the present specification, the carbide of the precursor of a support for an electrode catalyst means carbonizing the precursor of a support for an electrode catalyst.

The support for an electrode catalyst has strengthened durability compared to existing polymer layer-formed supports.

One embodiment of the present specification provides an electrode catalyst having metal nanoparticles supported on the support for an electrode catalyst.

The metal nanoparticle supporting process may be carried out using a composition for preparing a catalyst including the support for an electrode catalyst; a metal precursor; and a solvent.

According to one embodiment of the present specification, the content of the support for an electrode catalyst may be greater than or equal to 0.01% by weight and less than or equal to 3% by weight based on the total weight of the composition for preparing a catalyst.

According to one embodiment of the present specification, the metal precursor is a material prior to being reduced to metal nanoparticles, and the metal precursor may be selected depending on the metal nanoparticle types.

According to one embodiment of the present specification, the metal precursor may be a precursor of two or more types of metals different from each other.

According to one embodiment of the present specification, the metal precursor may be a nitrate ($NO_3^-$), a halide, a hydroxide ($OH^-$) or a sulfate ($SO_4^-$) of a metal.

According to one embodiment of the present specification, the metal precursor may be a precursor of one or more types of metals selected from the group consisting of platinum (Pt), cobalt (Co), nickel (Ni), iron (Fe), lead (Pd), ruthenium (Ru), chromium (Cr) and copper (Cu), and may preferably be a platinum (Pt) precursor. Using a platinum precursor is preferred since platinum is more active compared to other metals when used as a catalyst of a fuel cell.

According to one embodiment of the present specification, the platinum precursor may be $PtCl_4$, $K_2PtCl_4$, $K_2PtCl_6$, $H_2PtCl_4$, $H_2PtCl_6$, $Pt(acac)_2$, $Pt(NH_3)_4(NO_3)_2$, $Pt(NH_3)_4Cl_2$, $Pt(CH_3NH_2)_4(NO_3)_2$, $Pt(CH_3NH_2)_4Cl_2$, $Pt(H_2O)_4(NO_3)_2$ or $Pt(H_2O)_4Cl_2$, and may preferably be $PtCl_4$.

In the present specification, acac means acetylacetonate.

According to one embodiment of the present specification, the content of the metal precursor may be from 0.1% by weight to 5% by weight based on the total weight of the composition for preparing a catalyst.

According to one embodiment of the present specification, a solvent included in the composition for preparing a catalyst may include one or more types selected from the group consisting of water, ethylene glycol, diethylene glycol and propylene glycol, and may preferably be ethylene glycol.

According to one embodiment of the present specification, the content of the solvent may be from 93% by weight to 98% by weight based on the total weight of the composition for preparing a catalyst.

According to one embodiment of the present specification, the composition for preparing a catalyst may further include one or more types selected from the group consisting of sodium hydroxide (NaOH), barium hydroxide ($Ba(OH)_2$), potassium hydroxide (KOH), calcium hydroxide ($Ca(OH)_2$) and lithium hydroxide (LiOH), and this is for adjusting a pH of the composition for preparing a catalyst by adding a basic material.

According to one embodiment of the present specification, the composition for preparing a catalyst may further include a reducing agent for reducing metal ions. However, when using a solvent capable of performing a role of a reducing agent such as ethylene glycol, a separate reducing agent may not be included.

According to one embodiment of the present specification, the reducing agent is not particularly limited as long as it has, while being a strong reducing agent with standard reduction potential of −0.23 V or less, reducing power capable of reducing dissolved metal ions and precipitating the metal ions as metal particles.

According to one embodiment of the present specification, the reducing agent may be at least any one selected from the group consisting of $NaBH_4$, $NH_2NH_2$, $LiAlH_4$ and $LiBEt_3H$.

According to one embodiment of the present specification, the metal nanoparticles may have an average particle diameter of greater than or equal to 2 nm and less than or equal to 20 nm, and specifically, greater than or equal to 3 nm and less than or equal to 10 nm. This has an advantage of having high catalyst efficiency since the metal nanoparticles are well-dispersed on the carbon support without being aggregated to each other.

The metal nanoparticle may have a spherical shape. In the present specification, a spherical shape not only means a completely sphere, but may also include shapes that are roughly spherical in the shape. For example, the metal nanoparticle may not have a smooth spherical-shaped outer surface, and the radius of curvature may not be constant in one metal nanoparticle.

The metal nanoparticle may be selected from among a solid particle including one type of a metal, a solid particle including two or more types of metals, a core-shell particle including two or more types of metals, a hollow metal particle including one, or two or more types of metals, a bowl-type particle including one, or two or more types of metals, a yolk-shell particle including two or more types of metals, and a porous particle including one, or two or more types of metals.

In one embodiment of the present specification, the electrode catalyst may be a support-metal nanoparticle composite.

In one embodiment of the present specification, the content of the metal nanoparticles may be greater than or equal to 15% by weight and less than or equal to 60% by weight based on the total weight of the support-metal nanoparticle composite. Specifically, the content may be greater than or equal to 20% by weight and less than or equal to 50% by weight.

One embodiment of the present specification provides a membrane-electrode assembly including an electrode catalyst layer including the electrode catalyst; and an electrolyte membrane.

Furthermore, one embodiment of the present specification provides a fuel cell including the membrane-electrode assembly.

The fuel cell may be formed using materials and methods known in the art except for including the electrode catalyst described above. When referring to FIG. 7, the fuel cell is formed including a stack (60), a fuel supply unit (80) and an oxidizer supply unit (70).

The stack (60) includes one, two or more membrane-electrode assemblies (MEA), and when including two or more membrane-electrode assemblies, a separator provided therebetween is included. The separator performs a role of preventing the membrane-electrode assemblies from being electrically connected, and delivering a fuel and an oxidizer supplied from the outside to the membrane-electrode assemblies.

The fuel supply unit (80) performs a role of supplying a fuel to the stack, and may be formed with a fuel tank (81) storing a fuel and a pump (82) supplying the fuel stored in the fuel tank (81) to the stack (60). As the fuel, gas or liquid state hydrogen or hydrocarbon fuel may be used, and examples of the hydrocarbon fuel may include methanol, ethanol, propanol, butanol or natural gas.

The oxidizer supply unit (70) performs a role of supplying an oxidizer to the stack. As the oxidizer, oxygen is typically used, and oxygen or air may be injected with a pump (82) to be used.

Hereinafter, the present specification will be described in detail with reference to examples. However, examples according to the present specification may be modified to various other forms, and the scope of the present specification is not to be construed as being limited to the examples described below. Examples of the present specification are provided in order to more fully describe the present specification to those having average knowledge in the art.

EXAMPLE 3 g of poly(4-vinyl pyridine) (Sigma-Aldrich, Inc.), a cationic polymer, and 60 mL of 1 M hydrochloric acid (HCl) were added to 1 L of water, and dissolved therein through sufficient stirring. After that, 6 g of $KNO_3$ was further dissolved therein, and 1.8 g of carbon black (Cabot Corporation, Vulcan XC-72R) was dispersed thereinto. The solution was stirred for 24 hours at room temperature, then washed with distilled water, and dried to prepare a first polymer layer-formed support. To 200 mg of the first polymer layer-formed support, 1190 mg of an aqueous poly(4-styrenesulfonic acid) solution (Sigma-Aldrich, Inc.) was introduced to coat an anionic polymer, and after stirring the result for 24 hours at room temperature, the result was washed with distilled water and dried to form a second polymer layer. After that, carbonization was carried out for 2 hours under an Ar atmosphere and 1000° C. condition to prepare a support having a crystalline carbon film formed on the surface.

After dispersing 65 mg of the prepared support into 25 mL of ethylene glycol, 74.1 mg of $PtCl_4$ and 50 mg of sodium hydroxide were added thereto, and after reacting the result for 3 hours at 160° C., the result was washed with ethanol and water to prepare a catalyst. Herein, the $PtCl_4$ was reduced by ethylene glycol, the solvent, and the supported particles were platinum solid particles.

A TEM image of the catalyst prepared in Example is shown in FIG. 1.

Comparative Example 1

6 g of poly(allylamine hydrochloride), a cationic polymer, was added to 1.5 L of water, and dissolved therein through sufficient stirring. After that, 6 g of $KNO_3$ was further dissolved therein, and 1.8 g of carbon black (Cabot Corporation, Vulcan XC-72R) was dispersed thereinto. The solution was stirred for 24 hours at room temperature, then washed with distilled water, and dried to prepare a first polymer layer-formed support. Processes of second polymer layer formation, carbonization and support other than the forming of the first polymer layer thereafter were performed in the same manner as in Example to prepare a catalyst.

A TEM image of the catalyst prepared in Comparative Example 1 is shown in FIG. 2.

Comparative Example 2

After dispersing 200 mg of carbon black (Cabot Corporation, Vulcan XC-72R) into distilled water, a solution dispersing 300 mg of pyrrole, a cationic polymer, into 3 mL of ethanol was introduced thereto. After stirring the solution for 1 hour at room temperature, a solution dispersing 300 mg of ammonium persulfate, an oxidizer, into 40 mL of distilled water was added dropwise thereto, and by sufficiently stirring the result, surface coating was progressed while polymerizing the polymer. This was washed with distilled water and dried to prepare a first polymer layer-formed support. Processes of second polymer layer formation, carbonization and support other than the forming of the first polymer layer thereafter were performed in the same manner as in Example to prepare a catalyst.

A TEM image of the catalyst prepared in Comparative Example 2 is shown in FIG. 3.

Experimental Example: Carbon Corrosion Evaluation 30 mg of the catalyst prepared in each of Example and Comparative Examples was mixed with 1.8 mL of isopropyl alcohol and 257 mg of a Nafion solution (EW1100, Nafion content in solution was 5 wt %) to make an ink, and after coating the ink on one side surface (cathode direction) of a Nafion electrolyte membrane using spray equipment, the remaining one side surface (anode direction) was coated in the same manner as above using 30 mg of a commercial catalyst. After that, the result was hot pressed at 140° C. to prepare a membrane-electrode assembly. A square electrode having a area of 5 cm$^2$ was used, and performance of a single cell was measured under an 80° C. atmosphere while supplying $H_2$/Air under a 100% humidity condition.

A carbon corrosion evaluation was progressed by repeating a section of 9 V (15 seconds) to 1.4 V (15 seconds) 1,000 times under a $H_2$ (anode)/$N_2$ (cathode) atmosphere, and results of carbon corrosion evaluation on the cell using each of the catalysts of Example and Comparative Examples are each shown in FIG. 4 (Example), FIG. 5 (Comparative Example 1) and FIG. 6 (Comparative Example 2) as a current density-voltage graph.

Through FIG. 1 to FIG. 3, it was identified that the support was normally progressed in all of Example and Comparative Examples, and through comparing FIG. 4 with FIGS. 5 and 6, an obvious difference in the performance between Example and Comparative Examples was identified. Specifically, it was identified that the opening of the current density-voltage curve (I-V curve) was maintained in Example even after the severe corrosion test, whereas there was almost no current flow after the corrosion test in Comparative Examples 1 and 2. This is a result indicating that corrosion resistance durability is enhanced in the cell using the catalyst of Example. Accordingly, it was proved that excellent durability was obtained when using an aromatic compound including a pyridine group, compared to when using an aliphatic compound (polyallylamine hydrochloride) or an aromatic compound that does not include a pyridine group (polypyrrole) as a cationic polymer.

The invention claimed is:

1. A precursor of a support for an electrode catalyst comprising:
    a carbon support;
    a first polymer layer formed on the carbon support, said first polymer layer comprising a first polymer having a charge; and
    a second polymer layer formed on the first polymer layer, said second polymer layer comprising a second polymer having a charge which is opposite to the charge of the first polymer,
    wherein the first polymer and the second polymer independently comprise an aromatic compound including a heteroatom,
    wherein the first polymer or the second polymer comprises a pyridine group,
    wherein the first polymer is a cationic polymer, and the second polymer is an anionic polymer, and
    wherein the forming of the first polymer layer is carried out by coating a solution comprising the first polymer and a solvent on the surface of the carbon support, and the solution further includes at least one acid among hydrochloric acid, nitric acid and sulfuric acid.

2. A support for an electrode catalyst comprising a carbide of the precursor of a support for an electrode catalyst of claim 1.

3. An electrode catalyst comprising:
    the support for an electrode catalyst of claim 2; and
    metal nanoparticles supported on the support.

4. A membrane-electrode assembly comprising:
    an electrode catalyst layer including the electrode catalyst of claim 3; and
    an electrolyte membrane.

5. A fuel cell comprising the membrane-electrode assembly of claim 4.

* * * * *